United States Patent [19]

Sugasaka et al.

[11] Patent Number: 5,420,964
[45] Date of Patent: May 30, 1995

[54] SYSTEM, FOR LEARNING AN EXTERNAL EVALUATION STANDARD

[75] Inventors: Tamami Sugasaka, Komae; Kazushige Saga, Asakusabashi; Minoru Sekiguchi, Machida; Shigemi Nagata, Yokohama, all of Japan

[73] Assignee: Fujitsu Limited, Kawasaki, Japan

[21] Appl. No.: 961,055

[22] Filed: Oct. 14, 1992

Related U.S. Application Data

[63] Continuation of Ser. No. 630,477, Dec. 20, 1990, abandoned.

[30] Foreign Application Priority Data

Dec. 20, 1989 [JP] Japan .................. 1-328401

[51] Int. Cl.⁶ ............................................. G06F 15/18
[52] U.S. Cl. ..................................... 395/23; 364/148; 395/22; 395/81
[58] Field of Search ........................ 395/22, 23, 81; 364/148

[56] References Cited

U.S. PATENT DOCUMENTS 4,884,216 11/1989 Kuperstein .................. 364/513
4,933,871 6/1990 De Sieno ..................... 364/513

OTHER PUBLICATIONS

Barto et al., "Neuronlike Adaptive Elements That Can Solve Difficult Learning Control Problems", IEEE Trans. on Systs., Man, and Cybernetics, vol. SMC-13(5), 1983, pp. 834-846.

Hale, F. J., Intro. to Control System Analysis and Design, Prentice-Hall, Inc., 1973, pp. 1-23.

Miller, W. T., "Real-Time Application of Neural Networks for Sensor-Based Control of Robots with Vision", IEEE Trans. Syst. Man, and Cybernetics, vol. 19 (4) 1989, pp. 825-831.

Bock et al, "The Project Alias: an Application of Collective Learning Systems Theory to an Adaptive Learning Image Analysis System", *International Workshop of Neural Networks & Their Applications*, pp. 407–427, Nov. 1989.

Agrawala, "Learning with Various Types of Teachers", *Proceedings of the First International Joint Conference on Pattern Recognition 30*, pp. 453–461, Oct. 30–Nov. 1, 1973.

Kosko, "Unsupervised Learning in Noise", *IJCNN International Joint Conference on Neural Networks*, pp. 7–17, Jun. 1989.

Ritter, et al, "Topology-Conserving Maps for Learning Visuo-Motor Coordination", *Neural Networks*, pp. 159–168, vol. 2, No. 3, 1989.

Bock, "A Natural Paradigm for Artificial Intelligence: Collective Learning Systems Theory", *The Second International Conference on Computers and Applications*, pp. 30–37, Jun. 1987.

(List continued on next page.)

*Primary Examiner*—Robert W. Downs
*Attorney, Agent, or Firm*—Staas & Halsey

[57] ABSTRACT

This invention pertains to neural network system for learning an external evaluation standard and for learning the evaluation from the outside for the processing result, in a system capable of internal evaluation of the correspondence between external information and the processing result of its own system for the input information. It purports to learn the external evaluation as the internal evaluation standard of the internal evaluation time. The learning system comprises an internal evaluation unit for evaluating an evaluation input pattern including input information at a first point in time and input information inputted at a point in time for the processing result of its own system for the input information according to the internal evaluation standard at a system execution time; and an evaluation desired pattern memory unit for making the external evaluation correspond with the evaluation input pattern and for memorizing it as an evaluation desired pattern for having the internal evaluation unit learn the external evaluation standard. The system is configured to have an internal evaluation unit to learn the evaluation desired pattern at a learning time of the system. This system is applicable in a robot control system.

12 Claims, 12 Drawing Sheets

OTHER PUBLICATIONS

European Search Report, The Hague, search completed Dec. 3, 1992.

Pourboghart et al., "Neural Network Models for the Learning Control of Dynamical Systems with Application to Robotics", Lect. Notes in Control, Springer Verlag, 1989, pp. 50–60.

McClelland et al., Explorations in Parallel Distributed Processing, MIT Press, 1988, pp. 1–3, 137–150.

Psaltis et al., "A Multilayered Neural Network Controller" IEEE Control Syst. Mag., Apr. 1988, pp. 17–21.

Elsley, R. K., "A Learning Architecture for Control Based on Back-Propagation Neural Networks" Proc. IEEE Intl. Conf. Neural Networks, 1988, pp. II 587–II 594.

Kung et al., "Neural Network Architectures for Robotic Applications," IEEE Trans. Robotics & Automation, Oct. 1989, pp. 641–657.

Franklin, J. A., "Refinement of Robot Motor Skills Through Reinforcement Learning", Proc. 27th Conf. Decision and Control, Dec. 1988, 1096–1101.

Williams, R. J., "On the Use of Backpropagation in Associative Reinforcement Learning", Jul. 1988, IEEE Conf. on Neural Networks, I-263-I-270.

Jameson, J., "A Neurocontroller Based on Model Feedback and the Adaptive Heuristic Critic", 1990 IEEE Conf. on Neural Networks, II, 37–44.

Werbos, P. J., "Backpropagation and Neurocontrol: A Review and Prospectus", IJCNN, Jun. 1989, I-209-I-216.

Leaver et al., "Stochastic Computing and Reinforcement Neural Networks", First IEE Intl. Conf. on Artificial Neural Networks, Oct. 1989, 163–170.

FIG. 8

| STEP | INPUT | | | OUTPUT | |
|---|---|---|---|---|---|
| | A | B | C | D | E |
| 0 | 01110000000 | 00000000000 | 00000000000 | 1.00 | 1 |
| 1 | 00000011100 | 01110000000 | 00000000000 | 0.59 | 1 |
| 2 | 00000001110 | 00000011100 | 01110000000 | 0.12 | 1 |
| 3 | 00001100000 | 00000001110 | 00000011100 | 0.95 | 0 |
| 4 | 00000000111 | 00001100000 | 00000001110 | 0.44 | 1 |
| 5 | 00000001110 | 00000000111 | 00001100000 | 0.00 | 1 |

FIG. 9

| STEP | INPUT | | | OUTPUT | |
|---|---|---|---|---|---|
| | F | G | H | I | J |
| 1 | 00000011100 | 01110000000 | 1.00 | 1.00 | 1 |
| 2 | 00000001110 | 00000011100 | 0.59 | 1.00 | 1 |
| 3 | 00001100000 | 00000001110 | 0.12 | 1.00 | 1 |
| 4 | 00000000111 | 00001100000 | 0.95 | 0.00 | 1 |
| 5 | 00000001110 | 00000000111 | 0.44 | 1.00 | 0 |

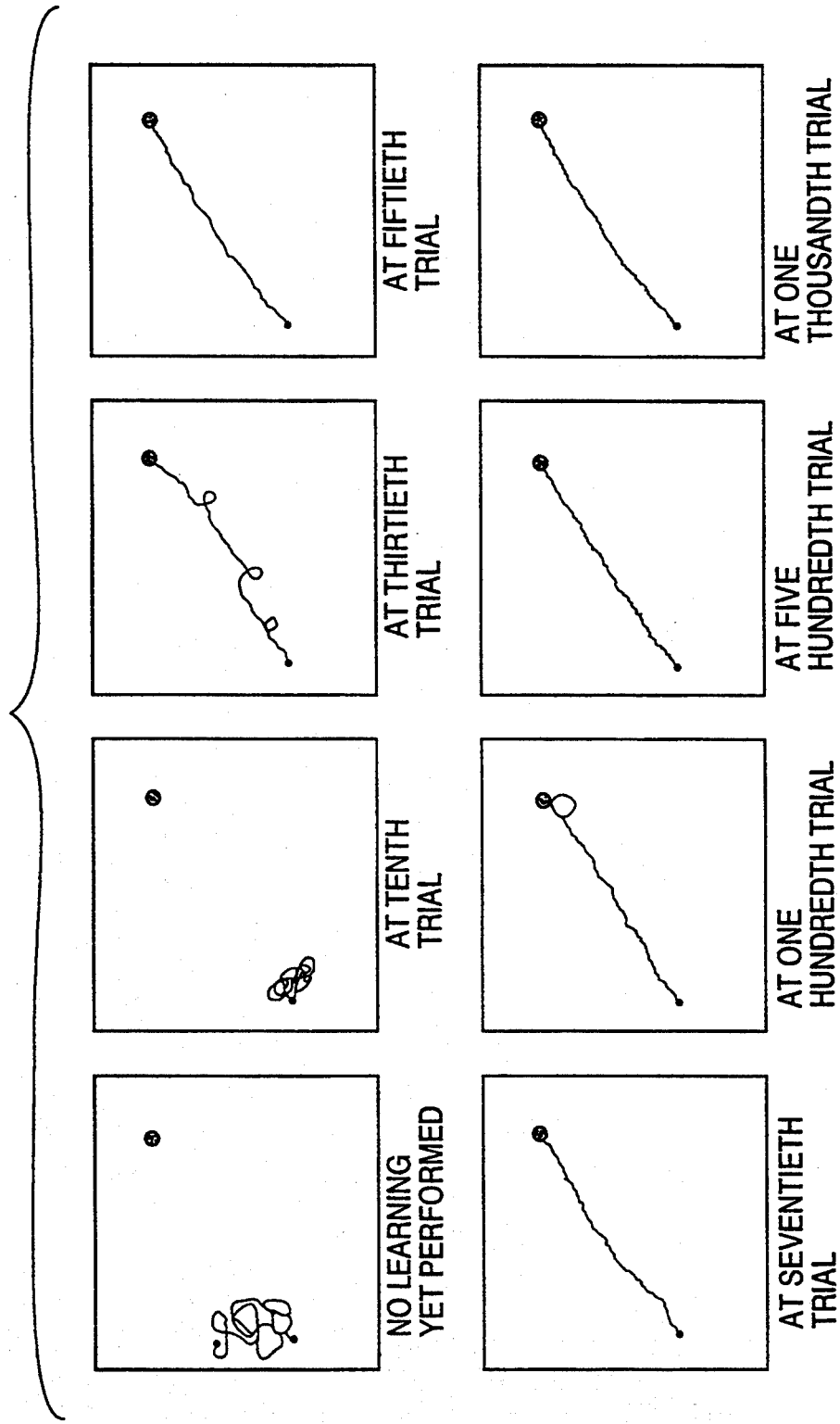

SYSTEM, FOR LEARNING AN EXTERNAL EVALUATION STANDARD

This application is a continuation of application Ser. No. 07/630,477, filed Dec. 20, 1990, now abandoned.

TECHNICAL FIELD OF THE INVENTION

This invention pertains to a learning system of a neural network, and more particular to a learning system of an external evaluation standard for learning the evaluation standard of an external evaluation, used in a system having the function of evaluating the correspondence between external input information and the external output produced by processing the external input information and, for taking external evaluation for the external output into the internal evaluation standard.

BACKGROUND OF THE INVENTION

Recently, a learning system such as a neural network has been applied to an alphabetical font recognition, a pattern recognition such as an image recognition, and control of an adaptation filter of a robot. However, in a learning system requiring teacher data, since it is difficult or even impossible to manually create teacher data, a learning system which automatically adapts to an outside environment is sought.

A neural network as a learning system capable of learning a desired pattern is applied in a wide variety of fields. A hierarchical neural network of a perception comprises three hierarchies, e.g. an input hierarchy, an intermediate hierarchy, and an output hierarchy. The output hierarchy outputs an output pattern in response to an input pattern to the input hierarchy. To enable the network to output a proper output pattern for an input pattern, a learning of a neural network is performed using a desired pattern. That is, a weight in the neural network is determined, e.g. by a back propagation method, so that a proper output pattern is presented for an input pattern and a proper output pattern is outputted. Thus, conventionally, the neural network performs its learning by using the desired pattern manually prepared beforehand.

However, in an actual application there are at least three patterns, a pattern related to a time series, a pattern whose desired pattern itself changes and a pattern for an unpredictable state. Problems arise such as the difficulty in determining the variety and quantity of the patterns prepared as desired patterns and the high time consumption of a desired pattern. Hence, to create a practical learning system in an actual application, an algorithm is required that enables the learning system itself to correspond with the input pattern and the output pattern, the corresponding input pattern to be evaluated according to an internal evaluation standard maintained in its own system, and the proper input or output pattern to be learned as the desired pattern.

Further, in a system capable of creating a desired pattern according to the internal evaluation standard, in case of a method without an interface for receiving an external evaluation for the output of the system itself, the system must be equipped with a predetermined internal evaluation standard. Therefore, when the system is applied to a variety of fields, problems exist. For example, the internal evaluation standard must be changed according to the particular application field resulting in a clock of system flexibility.

Therefore, a system is sought which has an interface for external evaluation, capable of self earning the evaluation standard of the external evaluation.

SUMMARY OF THE INVENTION

An object of the present invention is to enable a learning system, capable of creating a desired pattern with an internal evaluation standard, to learn the evaluation for the system's external output as the internal evaluation standard.

The present invention features a system for learning an external learning standard, used in a system having an internal evaluation standard and a function for evaluating the correspondence between an external input information and an external output of a processing result, of its own system for input information of the internal evaluation standard. Additionally, the present invention features a system for learning an evaluation standard of an external evaluation, for taking in the external evaluation of the external output to the internal evaluation standard. This system which comprises an internal evaluation unit for making an evaluation input pattern including input information at a particular point in time and input information at the point in time after the particular point in time for the output result of its own system for the input information an evaluation object information, for evaluating the evaluation input pattern of the internal evaluation standard and for outputting the evaluation result as the evaluation signal at an executing time of the system; and an evaluation desired pattern memory unit for receiving the external evaluation for the external output and for having the external evaluation correspond with the evaluation input pattern, and for having the internal evaluation part store the evaluation input pattern as an evaluation desired pattern for learning the evaluation standard of the external evaluation.

The present invention enables a learning system to learn the evaluation standard of the external evaluation system by using a simple external evaluation (reinforcement signal) and to use it as an internal evaluation standard of its own system. The learning system creates a desired pattern according to the internal evaluation standard, with which it learns of the processing of the external information inputted to its own system. Consequently, replacement of the internal evaluation standard of the learning system from outside is not needed. Instead, only an evaluation by an reinforcement signal needs to be supplied from outside, by monitoring the performance of the learning system. Therefore, when a learning system needs to be applied in various fields, the internal evaluation standard no longer needs to be replaced for each of the application fields, and a highly flexible learning system is built.

This invention is applicable to any system utilizing a learning feature such as of a neural network, e.g. various robot control systems and image processing systems,

BRIEF DESCRIPTION OF THE DRAWINGS

FIG. 8 is a diagram showing a data embodiment of an input pattern or an output pattern in a processing part;

FIG. 9 is a diagram showing a data embodiment of an input pattern or an output pattern in an internal evaluation part;

FIG. 10A and FIG. 10B are diagrams for explaining embodiments of the robot's learning effect using a first external evaluation standard.

DESCRIPTION OF THE PREFERRED EMBODIMENTS

Figure 1:
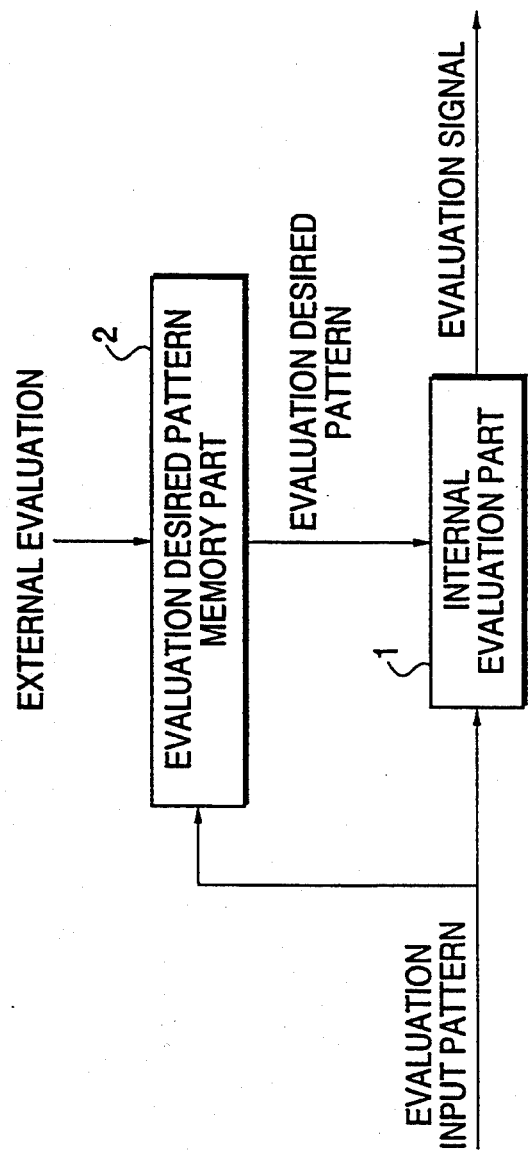
FIG. 1 is a principle block diagram of this invention.

FIG. 1 is a principle block diagram of a self learning system for learning an evaluation standard of an external evaluation, used in a learning system having a function for evaluating the correspondence between external input information and the external output produced by processing the external input information by the system itself, (e.g. a neural network), according to the internal evaluation standard and for taking the external evaluation for its external output into its internal evaluation standard.

In FIG. 1, an internal evaluation unit 1 evaluates input information, (e.g. an input pattern to a neural network) and a system output result of the input information, at a particular point in time during a system execution, (i.e. an evaluation input pattern including input information at the next point in time externally inputted for an outputs (pattern), as evaluation object information according to an internal evaluation standard, and outputs the evaluation result, (i.e. good or bad), as an evaluation signal.

An evaluation desired pattern memory unit 2 receives an external evaluation for the earlier described external output, has the external evaluation correspond with the evaluation input pattern, and has the internal evaluation unit 1 memorize it as a desired pattern for learning the evaluation standard of the external evaluation.

In FIG. 1, the evaluation desired pattern memorized in the evaluation desired pattern memory unit 2 at a system execution time, (i.e. the evaluation input pattern and its corresponding external evaluation), is given to the internal evaluation unit 1, (e.g. a neural network), at a learning time, and the internal evaluation unit 1 learns the evaluation desired pattern. Thus, the external evaluation for the system output is taken into the internal evaluation standard of the internal evaluation unit 1.

A system which realizes an object of this invention comprises a self learning method for learning an evaluation standard of an external evaluation, used in a learning system having the function of evaluating the correspondence between external input information, e.g. an input pattern, and the processing part of its own system for the input pattern, e.g. the external output of the processing result of the neural network, according to the internal evaluation standard. The internal evaluation unit 1 performs the evaluation.

The internal evaluation unit 1 evaluates the evaluation input pattern by using the evaluation input pattern including the input pattern to the system at a particular point in time, e.g. time t, and the input pattern to the system at the next point in time, i.e. time t+1. What is actually evaluated is the correspondence between the system processing part, e.g. the output pattern outputted by the neural network, and the input pattern at time t. The input/output pattern at time t is temporarily memorized in the system. When the evaluation signal outputted by the internal evaluation unit 1 at time t+1 is good, the input/output pattern is stored, e.g. in a desired pattern table for the system processing part. At a system learning time, the desired pattern stored in the desired pattern table is used for learning by the system processing part, e.g. the neural network.

When the evaluation signal by the internal evaluation unit 1 at time t+1 for the input/output pattern at time t is bad, the input/output pattern is not stored in the desired pattern table. Hence, the learning by the system processing part is performed only for the input/output pattern whose evaluation signal outputted by the internal evaluation unit 1 is good.

Accordingly, this invention enables the external evaluation of the system for the evaluation input pattern to be learned by the internal evaluation unit 1 as the evaluation desired pattern.

Figure 2:
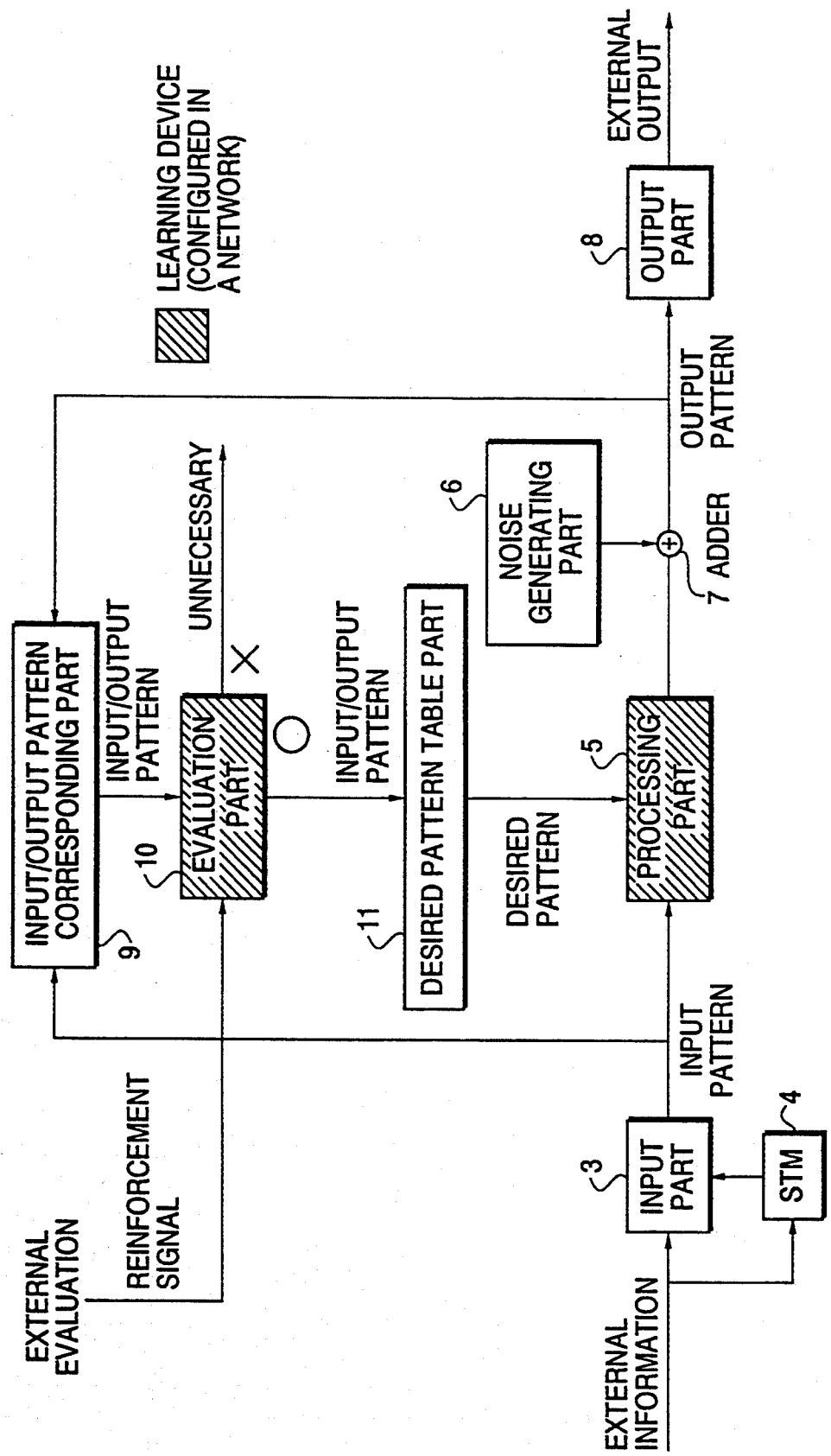
FIG. 2 is a block diagram showing the system configuration of an embodiment of the learning system of this invention.

FIG. 2 is a block diagram showing the system configuration of an embodiment of the learning system of this invention. The system comprises an input part 3 for receiving external information; a memory (STM) 4 for storing past external information as necessary; a processing part, e.g. a neural network, 5 for processing an input pattern created by the input part 3; a noise generating part 6 for generating noise to be added to the output of the processing part 5; an adder 7; an output part 8 for converting the output from the adder 7 to an external output; an input/output corresponding part 9 for having the input pattern outputted from the input part 3 correspond with the conforming output from the adder 7, (i.e. the output pattern) and for outputting the corresponding relation as an input/output pattern; an evaluation part 10 for judging whether the input/output pattern outputted from the input/output pattern corresponding part 9 is good or bad, by using the input/output pattern outputted from the input/output corresponding part 9 and the external evaluation supplied from the outside of the system, (i.e. a reinforcement signal or the like) and for outputting an input/output pattern whose judging result is good; and a desired pattern table part 11 for storing the input/output pattern whose evaluation outputted from the evaluation part 10 is good and for outputting the input/output pattern as a desired pattern at a learning time of the processing part 5.

In the embodiment of FIG. 2, the noise outputted from the noise generating part 6 is added to the output from the processing part 5 for actively discovering the desired pattern for the processing part 5. Thus, the processing part 5, e.g. the neural network, always outputs the same output pattern for a particular input. To find the proper output pattern for a particular input pattern, i.e. to obtain the proper desired pattern, the noise is added to the output from the processing part 5 and the external output for the output pattern is outputted to the outside of the system, so that the system is disturbed. Since the change in the external information for the disturbance is evaluated by the internal evaluation standard described earlier, it becomes easier to search the proper output pattern, i.e. the desired pattern.

Figure 3:
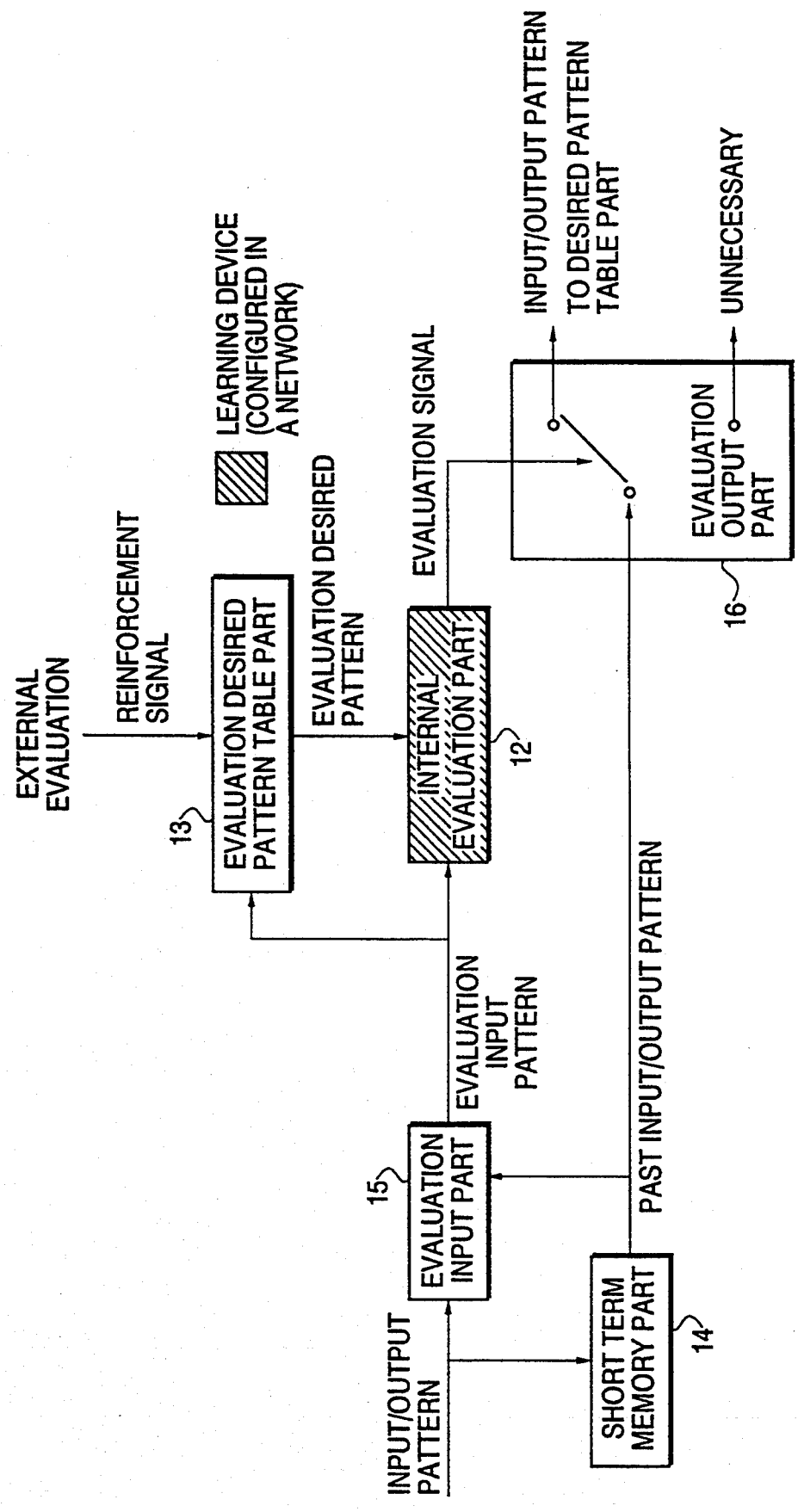
FIG. 3 is a block diagram showing the configuration of an embodiment of an evaluation part.

FIG. 3 is a configuration block diagram showing an embodiment of the evaluation part 10 shown in FIG. 2. In FIG. 3, the evaluation part 10 comprises an internal evaluation part 12 corresponding to the internal evaluation unit 1 shown in FIG. 1; an evaluation desired pattern table part 13 corresponding to the evaluation desired pattern memory unit 2 shown in FIG. 1; a short term memory unit 14 for temporarily storing the input/output pattern; an evaluation input part 15 for creating the evaluation input pattern including a current input pattern and a past input pattern by using the past input/output pattern outputted from the short term memory part 14 and the input/output pattern; and an evaluation output part 16 for outputting the past input/output pattern to the desired pattern table part 11 shown in FIG. 2 when the evaluation signal outputted from the internal evaluation part 12 is good.

In the embodiment of FIG. 2, at system execution time, the processing part 5, e.g. the neural network, processes an input pattern created from external information which is inputted to the system. The output part 8 converts an output pattern, to which noise generated by the noise generating part 6 is added, to an external output and outputs it to the outside of the system. Concurrently, inside the system, the input/output pattern corresponding part 9 outputs the input pattern and the output pattern outputted from the adder 7 as the input/output pattern to the evaluation part 10. If the above actions are executed at time t, since the external output changes the external environment, new external information is given to the input part 3 at time t+1. By using this external information, the input/output pattern corresponding part 9 gives an input/output pattern to the evaluation part 10 at time t+1 in a similar manner to the case at time t.

Meanwhile, in the embodiment of FIG. 3, the input/output pattern at time t is temporarily stored in the short term memory part 14. The input/output pattern at time t+1 and the output from the short term memory part 14, i.e. the input/output pattern at time t, are inputted to the evaluation input part 15, which gives the evaluation input pattern including the input pattern at time t+1 and the input pattern at time t to the internal evaluation part 12 and the evaluation desired pattern table part 13.

The internal evaluation part 12 evaluates the inputted evaluation input pattern according to the internal evaluation standard and outputs the evaluation signal indicating good or bad to the evaluation output part 16. When this evaluation signal is good, the evaluation output part 16 outputs the input/output pattern at time t, i.e. the past input/output pattern to the desired pattern table part 11 shown in FIG. 2. The evaluation desired pattern table part 13 stored the correspondence between the external evaluation given from the outside of the system at time t+1, i.e. the reinforcement signal, and the evaluation input pattern.

At a system learning time, in the embodiment of FIG. 2, the learning of the processing part 5, e.g. the neural network, is performed by using the desired pattern stored in the desired pattern table part 11. However, in the embodiment of FIG. 3, the learning of the internal evaluation part 12 is performed by using the evaluation desired pattern stored in the evaluation desired pattern table part 13.

Figure 4:
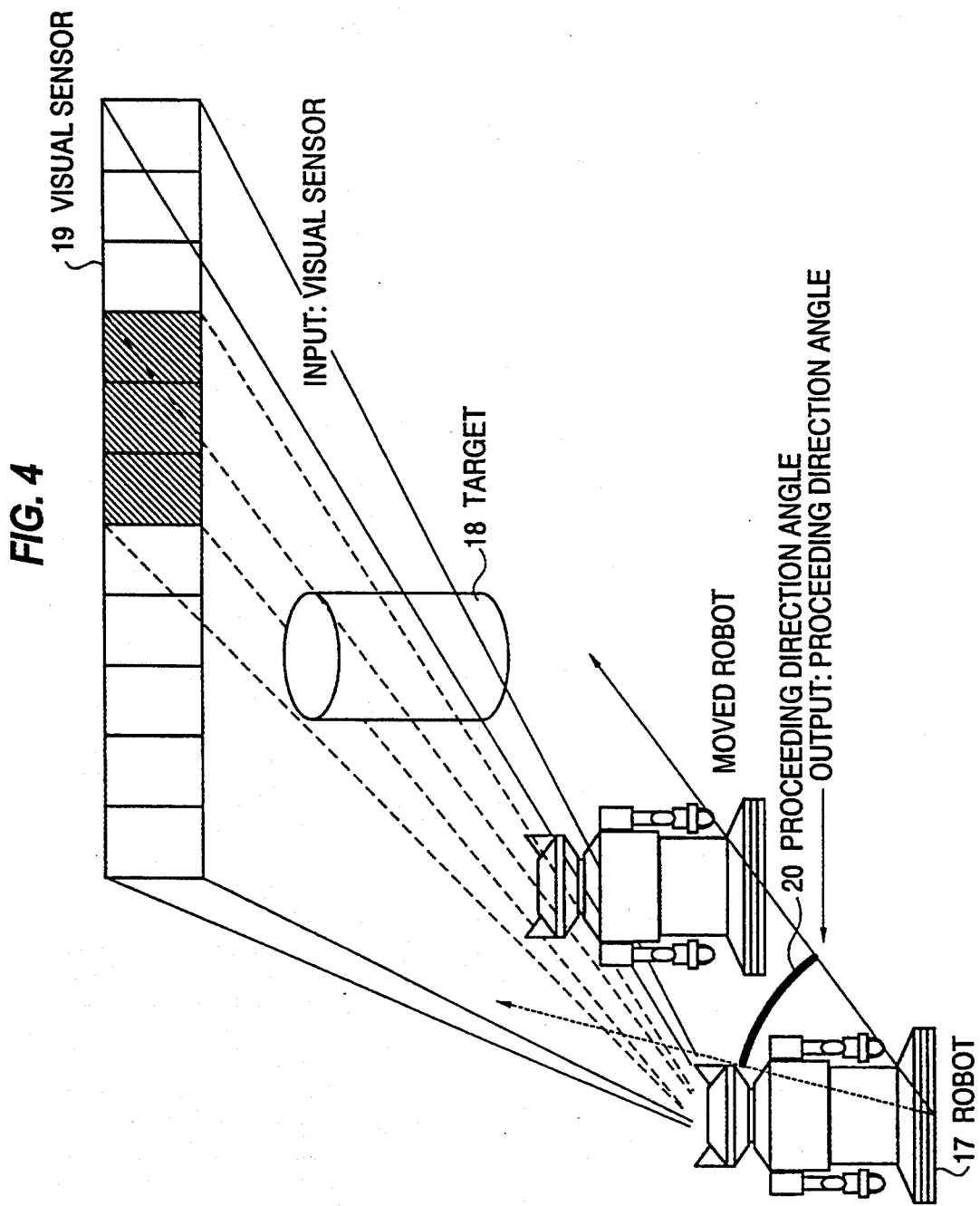
FIG. 4 shows an embodiment for a robot control using the learning method of this invention.

FIG. 4 shows an embodiment for a robot control using the learning method of this invention. In FIG. 4, assume that a robot 17 performs a capturing action by approaching a target 18 and capturing it. The robot 17 has a visual sensor 19 and gives its output to the input part 3 shown in FIG. 2 as the external information. The output part 8 converts the output pattern, i.e. the output from the processing part 5 added to the noise generated from the noise generating part 6, to the rotating angle of the robot's motor. A robot's proceeding direction angle 20 is determined according to the rotating angle, and the robot 17 moves one step in that angular direction.

Figure 5:
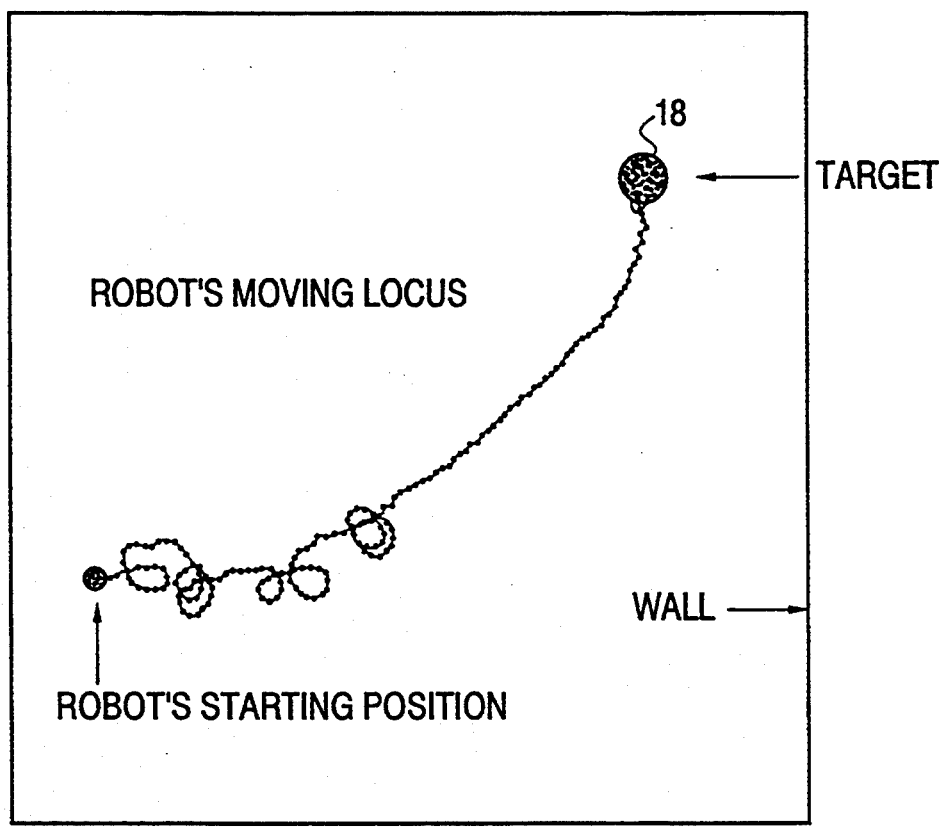
FIG. 5 is a diagram showing an embodiment for controlling a robot's movement locus from a starting position to a target.

FIG. 5 shows an embodiment for a robot's movement locus from a starting position to a target. FIG. 5 shows the movement locus of the robot's step by step movement from its starting position to its target 18. In this embodiment, one trial is defined as sequences of the robot until it captures the target. A simulation described later is performed in which the trial is deemed to be a failure if the number of movement steps exceeds 100 or the robot hits a wall in the movement. FIG. 5 shows the movement locus of the result.

Figure 6:
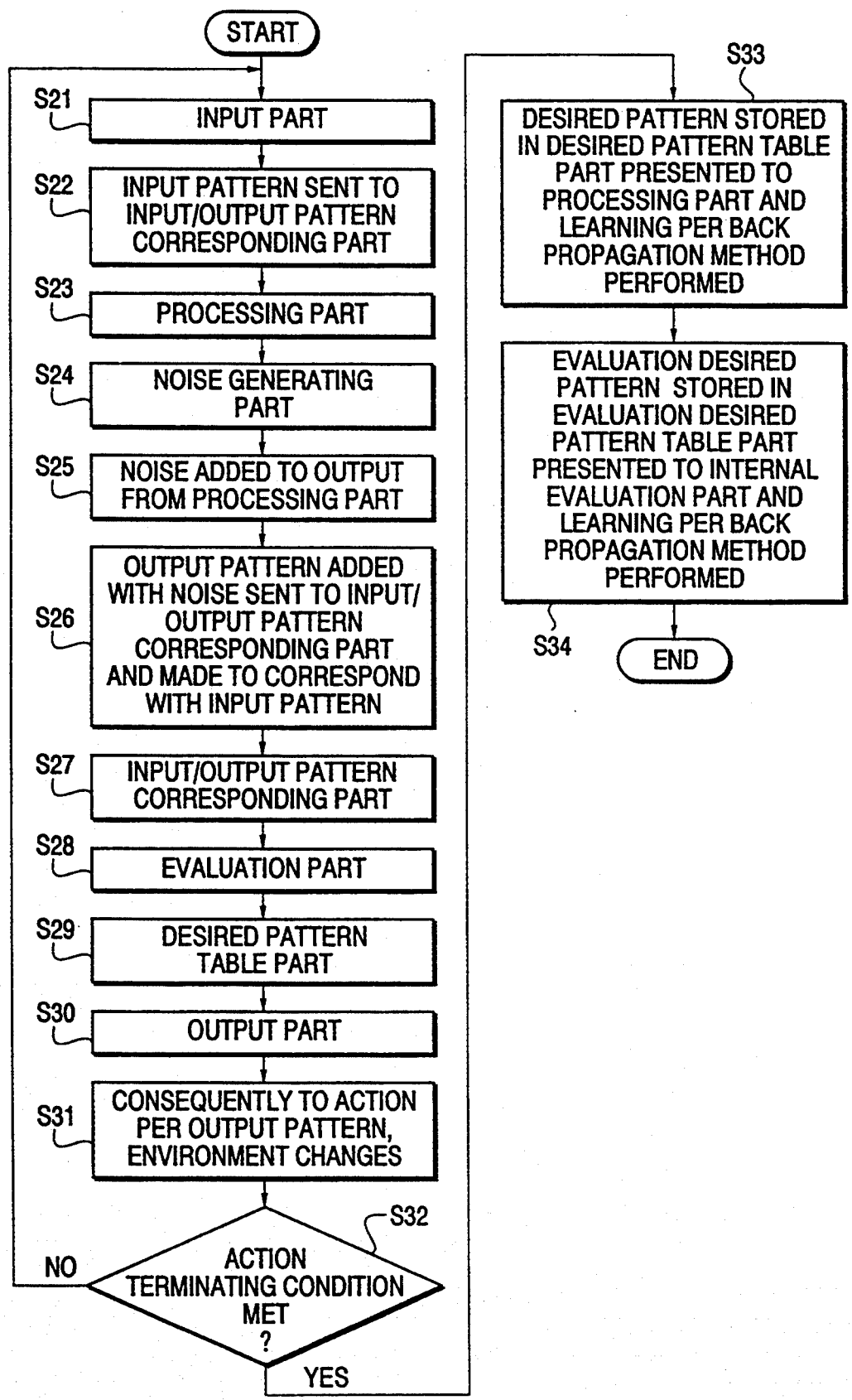
FIG. 6 is a flowchart showing a system processing embodiment of the learning method of this invention.

FIG. 6 is a flowchart showing a system processing embodiment of the learning method of this invention. In FIG. 6, when the processing starts, the input part 3 converts external information to an input pattern in S21. This input pattern is sent to the input/output corresponding part 9 in S22, and the processing part 5, e.g. the neural network, performs the processing for the input pattern in S23. Here, the processing part 5 comprises e.g. a neural network with three hierarchies.

For the output from the processing part 5, the noise generating part 6 generates noise in S24, and this noise is added to the adder 7 in S25. The output pattern to which the noise is added is sent to the input/output pattern corresponding part 9 in S26, where it corresponds with the input pattern sent to S22, and the input/output pattern corresponding part 9 outputs it as the input/output pattern in S27. The evaluation part 10 evaluates this input/output pattern according to the internal evaluation standard in S28. If the evaluation result is good, the input/output pattern is sent to the desired pattern table part 11 in S29.

The output part 8 converts the output pattern outputted from the adder 7 to the external output in S30, and is outputted to outside of the system. The external output changes the external environment in S31. In case of a robot control, for example, the output from the visual sensor 19 changes. It is judged in S32 whether any action terminating conditions, e.g. the capturing of the target, the movement steps in excess of 100 or the robot hitting the wall in case of the robot described earlier, is met. If none is met, the processes from S21 are repeated.

When any of the action terminating conditions is met in S32, the learning of the processing part 5 through the back propagation method by using the desired pattern stored in the desired pattern table part 11 is performed in S33. The learning of the internal evaluation part 12 through the back propagation method by using the evaluation desired pattern stored in the evaluation desired pattern table part 13 is performed in S34, then the processings are terminated.

Figure 7:
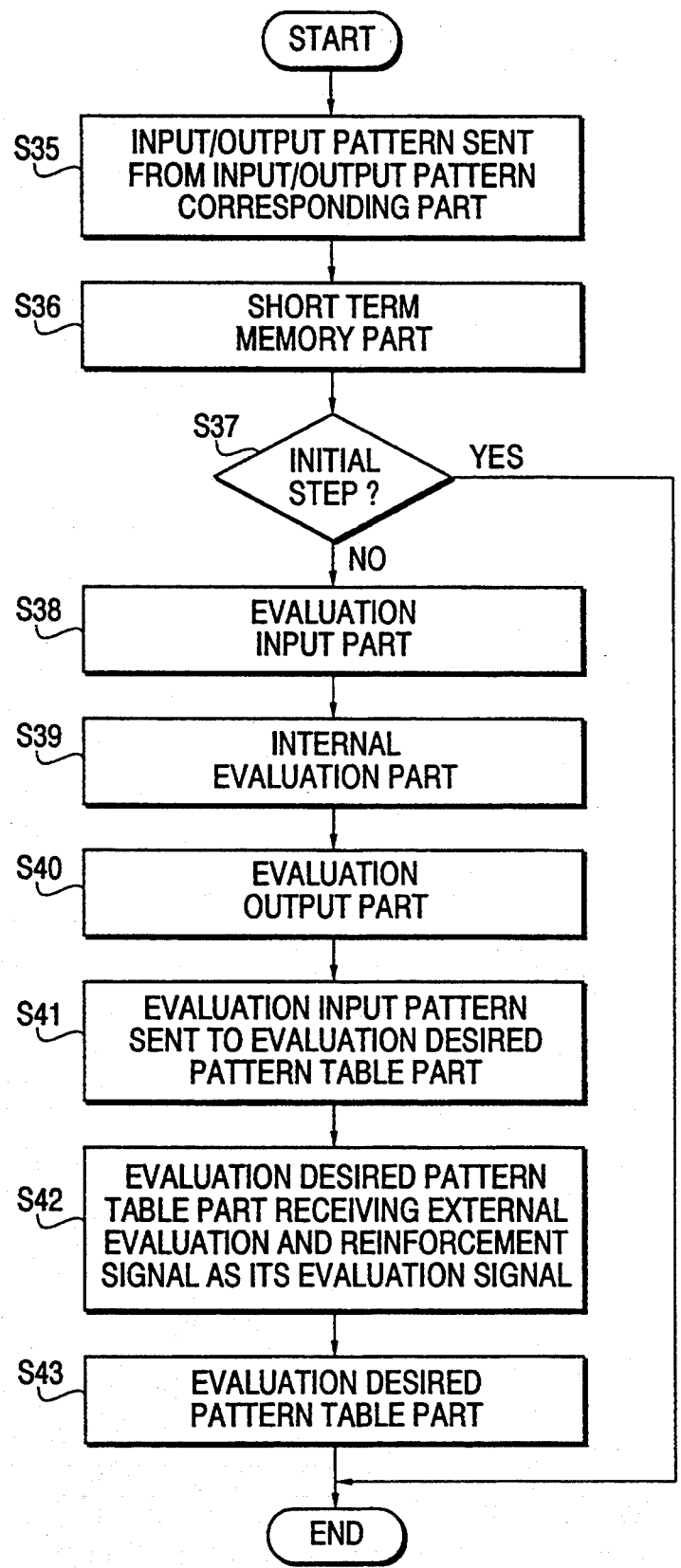
FIG. 7 is a flowchart showing a processing embodiment of the evaluation part.

FIG. 7 is a flowchart showing a processing embodiment of the evaluation part. In FIG. 7, when the processes begin, first the input/output pattern is sent from the input/output pattern corresponding part 9 in S35, and its input/output pattern is stored in the short term memory part 14 in S36. Then in S37, it is judged whether or not the current step is the first step of the robot movement, and the processing is terminated in case of the initial step, because the evaluation input pattern described earlier cannot be obtained.

In case of a non-initial step in S37, the evaluation input part 15 creates the evaluation input pattern in S38 and the internal evaluation part 12 evaluates the evaluation input pattern in S39, and the resultant evaluation signal is outputted to the evaluation output part 16 in S40. The evaluation input pattern is sent to the evaluation desired pattern table part 13 in S41. Meanwhile, the external evaluation supplied from outside the system, i.e. the reinforcement signal given to the evaluation input pattern in S42, and the external evaluation in correspondence with the evaluation input pattern is stored in the evaluation desired pattern table part 13 in S43, and the processings are terminated.

More detailed description of the earlier mentioned simulation of the learning method of this invention for the robot's actions of capturing the target is as follows. In FIG. 4, the visual sensor 19 of the robot 17 has a plurality of sensor elements in a row, and the sensor element that captures the target 18 reacts. The output of the reacted sensor element is 1 and the output of the non-reacted sensor element is 0. In the present simulation, the visual sensor 19 comprises eleven (11) sensor elements. The visual field of the visual sensor 19 is forty-five (45) degrees right and left. The visual field of one sensor element is approximately eight (8) degrees. In this embodiment, to enable a processing including a past information flow (a time series processing), an input to the processing part 5 shown in FIG. 2, i.e. an input to the neural network, is not limited to the current input of the visual sensor 19, but a past sensor output is also inputted. In the present simulation, visual sensor information up to two steps before it is inputted to the processing part 5. Therefore, the input hierarchy of the processing part 5 which is a three hierarchy neural network comprising an input hierarchy, an intermediate hierarchy and an output hierarchy comprises a total of thirty-three (33) units for three time series of the eleven visual sensor elements and one unit for threshold. The intermediate hierarchy comprises ten (10) units, and the output hierarchy comprises one unit for determining the robot's rotating angle.

In this embodiment, since the processing part 5 is supplied with the input pattern including the past sensor output, the external information to the system is temporarily stored in the memory (STM) 4, and the current external information and the past information taken out from the memory (STM) 4 are sent to the input part 3 which is assembled into the input pattern by the input part 3 to be outputted to the processing part 5. An output pattern is obtained by adding the noise to the output from the processing part 5. The output part 8 converts the output pattern into the robot's motor rotating angle which is outputted as the external output. The present simulation is provided with a forty-five (45) degree limit right and left.

Similar to the earlier description, the internal evaluation part 12 shown in FIG. 3 comprises a neural network, i.e. a three-hierarchy network comprising an input hierarchy, an intermediate hierarchy and an output hierarchy. The input hierarchy comprises a total of twenty-three (23) units to which eleven (11) current visual sensor inputs, and eleven (11) visual sensor inputs of a step earlier, and a robot's motor rotating angle of a step earlier are inputted. The intermediate hierarchy comprises five units. The output hierarchy comprises an unit for determining whether the evaluation signal is good or bad.

The evaluation input part 15 extracts the current sensor input, the visual sensor input of a step earlier, and the rotating angle output of a step earlier, and gives them as the evaluation input pattern to the internal evaluation part 12. The internal evaluation part 12 processes the evaluation input pattern and has the evaluation output part 16 select whether or not to have the desired pattern table part 11 store the input/output pattern of a step earlier stored in the short term memory part 14 by outputting the evaluation signal. The learning of the internal evaluation standard in the internal evaluation part 12 in this case is performed by using the evaluation desired pattern stored in the evaluation desired pattern table part 13 at learning time.

FIG. 8 shows a data embodiment of an input pattern or an output pattern in the processing part 5 shown in FIG. 2. FIG. 9 shows a data embodiment of an evaluation signal as an input pattern or an output pattern in the internal evaluation part 12 shown in FIG. 3. As described earlier, the processing part 5 receives current visual sensor output A, one step earlier visual sensor output B and two steps earlier visual sensor output C, as its input patterns. Assume that the robot's starting time is step 0. Then, data B and C at step 0 are all 0. The output from the adder 7 at step 0, i.e. the output D to which a noise generated from the noise generating part 6 is 1.00, and as described earlier, this output determines the robot's direction of movement.

Data E indicate an evaluation signal of the internal evaluation part 12 shown in FIG. 3 for the input/output pattern comprised of data D, namely, the input patterns including data A, B and C and their corresponding output patterns. This evaluation signal is actually outputted from the internal evaluation part 12 at the next step, i.e. step 1, and is an evaluation signal for the input/output pattern at step 0 whose value is shown at the position of step 0. The input/output pattern corresponding to this value being 1 is stored in the desired pattern table part 11 and learned at a learning time. That is, a learning is performed such that output pattern D is realized for input patterns A, B and C whose data E are 1.

In FIG. 8, the input data A at step 0 becomes data B, and the current visual sensor output at step 1 is provided as data A. As a result, output pattern D which is obtained by adding noise to the output from the processing part 5 becomes 0.59. This value is obtained by normalizing the robot's motor rotating angle between 0 and 1. Data A at step 0 and data A at step 1 respectively become C and B at step 2, where data A are the current visual sensor output at step 2. Generally speaking, data worth a few tens of steps are similarly obtained until any of the robot's terminating conditions, i.e. capturing the target, the step number reaching 100 and hitting the wall, is met. However, for simplicity, FIG. 8 only shows data as far as step 5.

As described earlier, the evaluation input pattern supplied to the internal evaluation part 12 shown in FIG. 9 comprises current sensor output F, one step earlier visual sensor output G, and the one step earlier output pattern from the processing part 5, i.e. output H from the adder 7, whereas the output pattern outputted from the internal evaluation part 12, i.e. the evaluation signal, is data I, and the external evaluation provided to the system from outside, i.e. the reinforcement signal, is data J.

In FIG. 9, data A at step 0, data A at step 1 and data D at step 0 respectively become data G, data F and data H at step 1. The evaluation input part 15 regards them as the evaluation input patterns and inputs them to the internal evaluation part 12. The internal evaluation part 12, i.e. the neural network, processes these input patterns and outputs data I as their evaluation signals which are 1.00 in this case. As described earlier, these values become data E at step 0 shown in FIG. 8. The external evaluation for the external output outputted from the output part 8 at step 0 is provided to the evaluation desired pattern table part 13 as data J, and a learning is performed at a learning time such that output pattern J is realized for input patterns F, G and H. This learning is performed for all evaluation desired patterns stored in the evaluation desired pattern table part 13. When proper output pattern J is outputted for input patterns F, G and H, however, the learning of the back propagation method is not performed for the evaluation desired pattern already studied. Because data at and after step 2 are identical to those at step 1, their explanation is omitted.

In this embodiment, the robot moves from its starting position step by step, e.g. as shown in FIG. 5. During one trial until the target 18 is captured after actions comprising a few tens of steps, the external evaluation for the external output of the system and its evaluation object, i.e. the evaluation input pattern, are stored in the evaluation desired pattern table part 13 as the evaluation desired pattern. When the evaluation signal of the internal evaluation part 12 for the evaluation input pattern is good, the one step earlier input/output pattern is stored as the desired pattern in the desired pattern table part 11. After termination of the robot's movement of one trial, the learning of the processing part 5 and the internal evaluation part 12 is performed.

As previously stated, this learning is performed according to the back propagation method which gives the weight updating quantity, e.g. for the connecting weight $W_{ji}$ from unit i in the input hierarchy to unit j in the intermediate hierarchy, by the following equation.

$$\Delta W_{ji}(n+1) = \eta \delta_j O_i + \alpha \Delta W_{ji}(n)$$

where $\Delta W_{ji}(n)$ indicates the updating quantity at the weight updating time at the n-th time, $\delta_j$ indicates the error of unit j, and $O_i$ indicates the output from unit i.

The first term of the above equation is for proportioning the weight updating quantity to the weight $W_{ji}$'s effect $E_p/W_{ji}$ on the second power error $E_p$, and the proportional constant $\eta$ is called the learning constant. The larger this constant, the larger the weight updating quantity. Accordingly, the largest possible $\eta$ is chosen to expedite the learning within a range in which an oscillation is not induced. The second term is an inertia term added to the weight changing equation for preventing the weight oscillation, and its constant $\alpha$ is called the learning speed constant. This term is for determining the magnitude of the effect by the one time earlier weight updating quantity on the current updating quantity.

In the simulation in this embodiment, the learning constant values 0.03 and the learning speed constant values 0.01 are set for both the processing part 5 and the neural network of the internal evaluation part 12 in the learning. The following two standards are used for the external evaluation standards for the system's external output.

First external evaluation standard: The robot approaching the target is good, and all others are bad.

Second external evaluation standard: The robot approaching the target is good until it is close. When it is close, the robot approaching the target by circling the target is good. All others are bad.

Figure 10B:
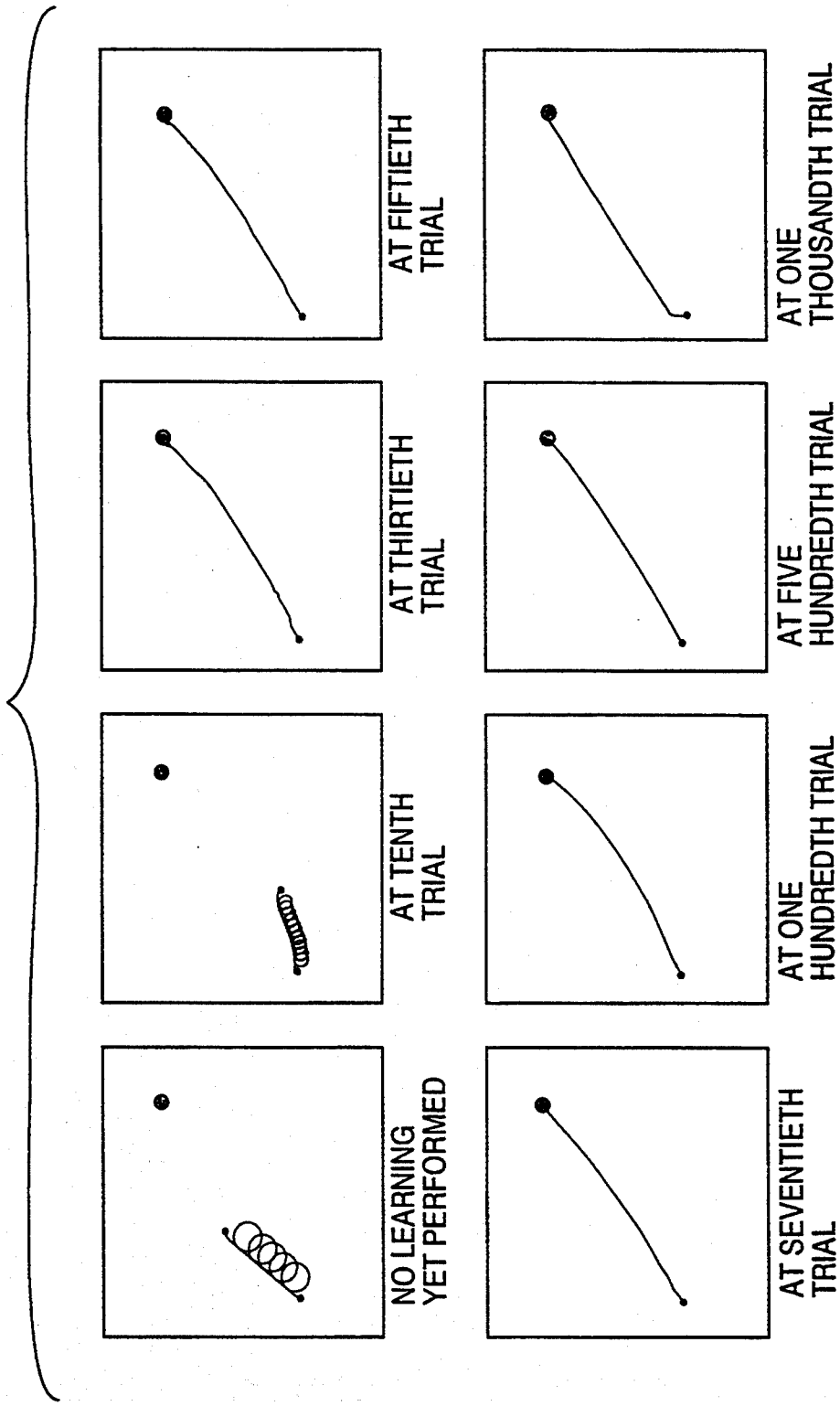

FIGS. 10A and 10B are diagrams for explaining embodiments of the robot's learning effect using the first external evaluation standard. FIG. 10A shows case in which the output pattern, to which a noise generated by the noise generating part 6 shown in FIG. 2 is added at testing time, is used for testing. FIG. 10B shows a case in which the output from the processing part 5 is used "as is" as the output pattern without adding noise. Naturally, the noise generated from the noise generating part 6 is always added at an executing time.

FIGS. 10A and 10B respectively show a state in which a learning is not yet performed and the respective testing results after 10, 30, 50, 70, 100, 500, and 1,000 trials are terminated. At the fiftieth trial, the robot almost certainly approaches the target. In test in which a noise is applied to the network output, the target is also approached.

Figure 11A:
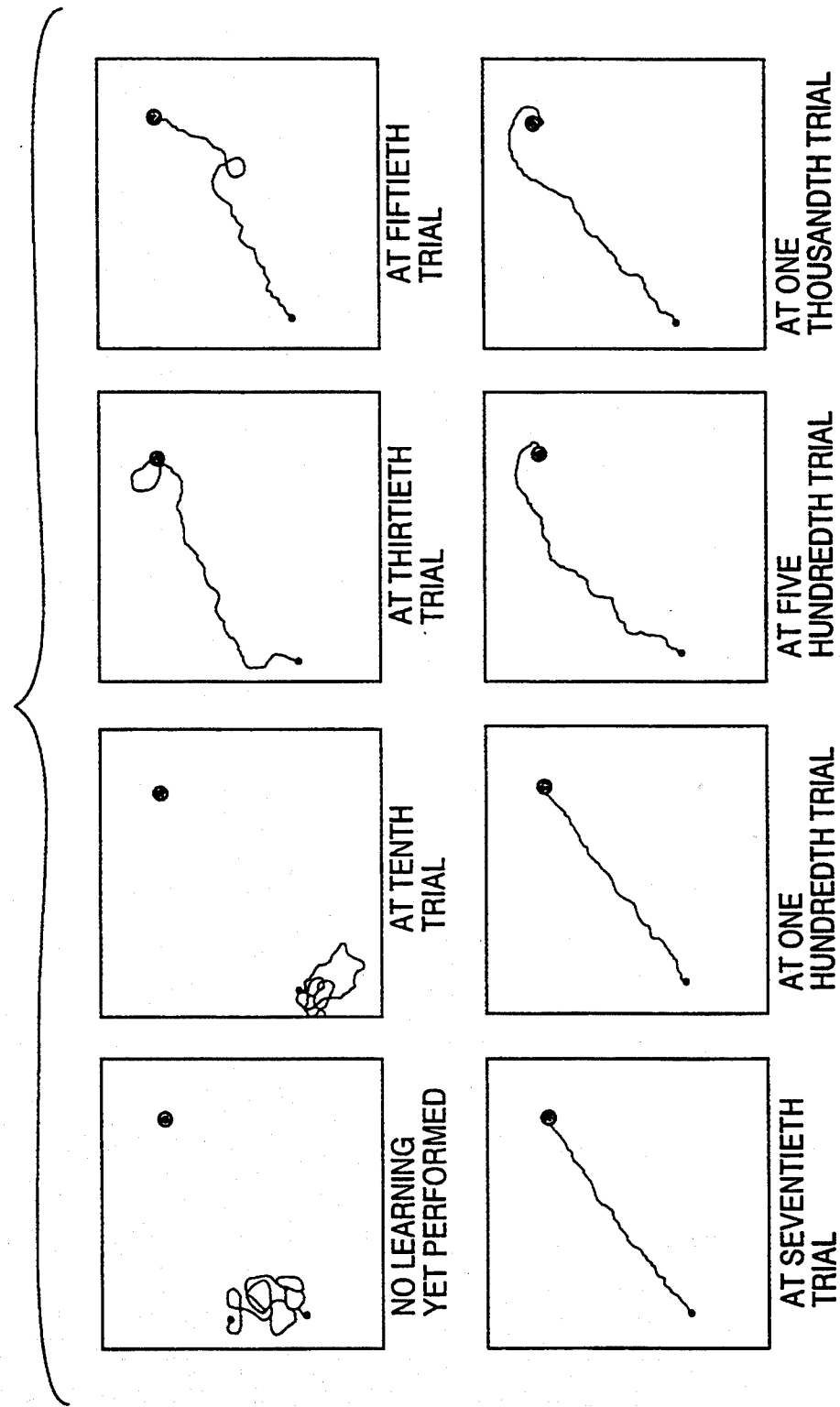
FIG. 11A and FIG. 11B are diagrams for explaining embodiments of the robot's learning effect using a second external evaluation standard.
Figure 11B:
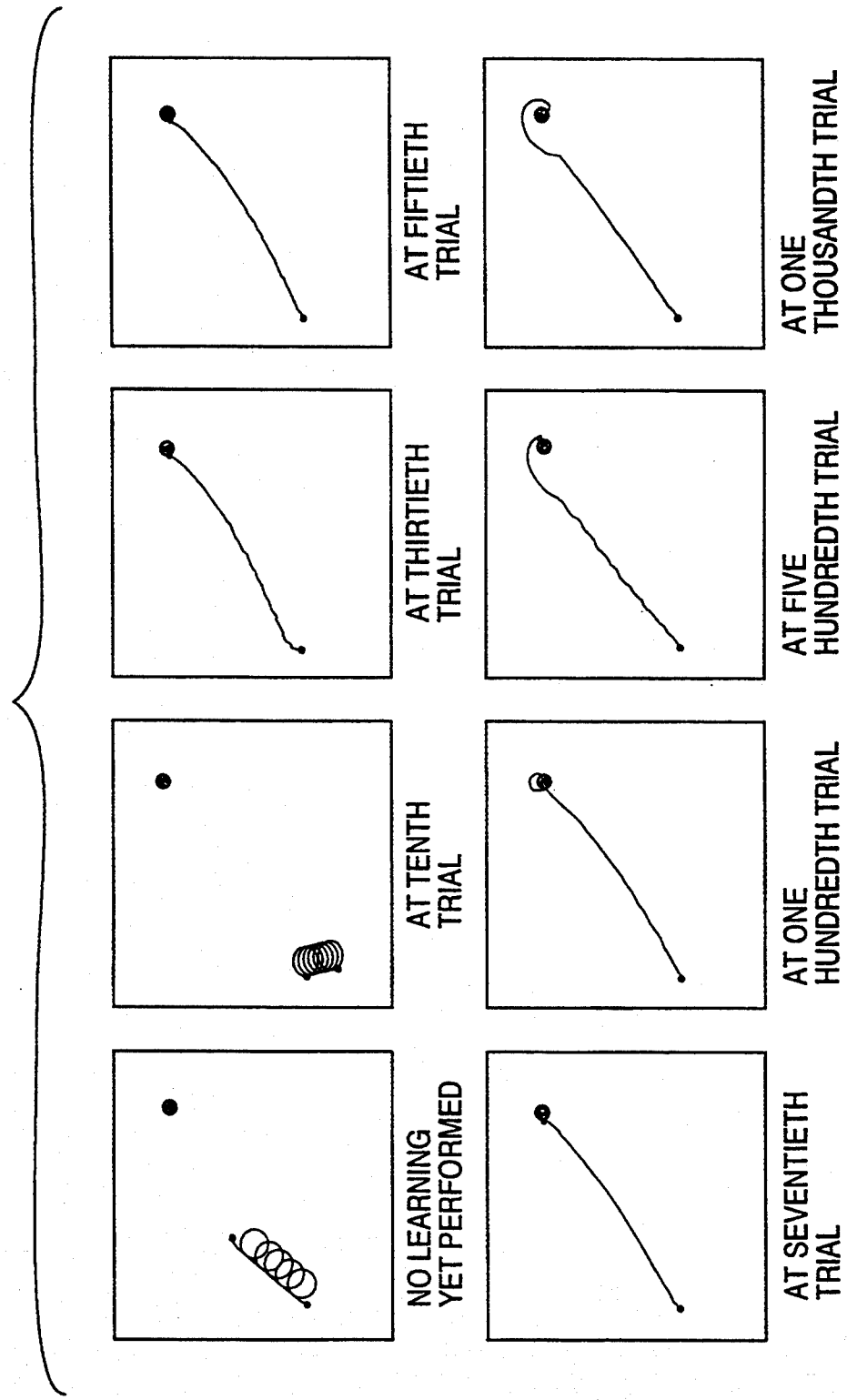

FIGS. 11A and 11B are diagrams for explaining embodiments of the robot's learning effect using a second external evaluation standard. The embodiments shown in FIGS. 11A and 11B utilizes the second external evaluation standard, in which the robot approaches the target. However, in the case shown in FIG. 11A in which noise is applied, generally speaking, the robot approaches the target initially, but it moves away from the target when it comes close to it.

In the above embodiments, the learning of the internal evaluation part 12 and the processing part 5 are assumed to be performed after the termination of the actions of one trial by the robot. However, they could naturally be performed at each step. The input timing to the evaluation desired pattern table part 13 of the external evaluation from outside of the system can also be appropriately varied according to the actual application.

What is claimed is:

1. A system for learning an external learning standard, said system having an internal evaluation standard and a function for evaluating a correspondence between external information and external output, produced from processing the external information according to input information of the internal evaluation standard, and for learning an evaluation standard of an external evaluation by using the external output and the internal evaluation standard, said system comprising:

neural network processing means for processing an input pattern based on a desired pattern as input information of the internal evaluation standard, independently of the external evaluation and providing an output pattern;

input/output pattern corresponding means for comparing the input pattern with the output pattern, and for outputting a corresponding relation as an input/output pattern;

evaluation means for judging whether the input/output pattern is correct by using a reinforcement signal as the external evaluation supplied from outside the system and the input/output pattern from the input/output pattern corresponding means, and for outputting the judged input/output pattern when an evaluation result of the judging is correct; and desired pattern table means for storing the judged input/output pattern whose evaluation result outputted from said evaluation means is correct, and for outputting the judged input/output pattern as an evaluation desired pattern at a learning time of said neural network processing means.

2. The system for learning the external evaluation standard according to claim 1 further comprising means for adding noise to said output pattern of said system.

3. The system for learning the external evaluation standard according to claim 1, further comprising:

input means for receiving the external information and for converting the external information to the input pattern;

a memory for storing past external information and for outputting the past external information to said input means;

noise generating means for generating noise;

adder means for adding the output pattern from said neural network processing means to the generated noise, producing a noise added output pattern; and output means for converting the noise added output pattern from said adder means to the external output.

4. The system for learning the external evaluation standard according to claim 3, wherein said evaluation means comprises;

a short term memory for temporarily storing the input/output pattern outputted from said input/output pattern corresponding means;

evaluation input means for creating an evaluation input pattern including a current input pattern and a past input pattern by using a current input/output pattern and a past input/output pattern outputted from said short term memory means;

neural network internal evaluation means for receiving the evaluation input pattern including input information at a first time and input information at a second time after the first time, and for evaluating the evaluation input pattern in accordance with the internal evaluation standard and for outputting an evaluation signal indicating whether the evaluating is correct;

evaluation output means for outputting the past input/output pattern stored in said short term memory means to said desired pattern table means when the evaluation signal indicates a correct evaluation outputted from said neural network internal evaluation means; and evaluation desired pattern memory means for receiving the reinforcement signal as the external evaluation for the external output from said output means, for making the reinforcement signal correspond with the evaluation input pattern, and for storing the evaluation input pattern as the evaluation desired pattern for having said internal evaluation means learn the evaluation standard of the external evaluation.

5. The system for learning the external evaluation standard according to claim 4, wherein said neural network internal evaluation means comprises means for receiving the evaluation input pattern including the current input pattern and the past input pattern, obtained as a result of said input means converting the external information at a current time and past external information stored in said memory, and the output pattern as an output from said adder means at a same past time as the past input pattern.

6. The system for learning the external evaluation standard according to claim 4, wherein said neural network internal evaluation means comprises means for receiving the evaluation input pattern including the current input pattern and the past input pattern, the current and past input pattern obtained as a result of said input means converting the external information at a current time and the external information converted at a past time and stored in said memory, respectively, and the output pattern from said adder means corresponding to the past input pattern.

7. The system for learning the external evaluation standard according to claim 3, wherein:

said input means includes means for converting the inputted external information to the input pattern and for sending the input pattern to said input/output pattern corresponding means;

said evaluation means includes means for evaluating the input/output pattern according to the internal evaluation standard, and for sending the input/output pattern to said desired pattern table means when the evaluation result is correct;

said output means includes means for converting the output pattern outputted from said adder means to the external output and for providing the external output outside of the system; and the system further comprises means for changing an external environment using the external output for judging whether the external output should be terminated due to an environmental change, for repeating actions, in an after-conversion of the external information to the input pattern, when the external output should not be terminated and for sending the desired pattern, stored in said desired pattern table means, to said neural network processing means when the external output should be terminated, so that learning using a back propagation method occurs.

8. The system for learning the external evaluation standard according to claim 7, further comprising:

short term memory means for storing the sent input/output pattern at a third time of the input/output pattern according to the internal evaluation standard by said evaluation means;

evaluation input means for determining whether an input of the external information is an initial input, for terminating processing if the external information is the initial input and for creating an evaluation input pattern if the external information is not initial external information;

neural network internal evaluation means for evaluating the evaluation input pattern;

evaluation output means for sending the input/output pattern in said short term memory means to the desired pattern table means when said evaluation is correct; and evaluation desired pattern memory means for receiving the reinforcement signal, wherein said evaluation input means includes means for providing the evaluation input pattern to the evaluation desired pattern memory means;

wherein said evaluation desired pattern memory means includes means for creating a correspondence between the reinforcement signal and the external evaluation with the evaluation input pattern and for storing the correspondence as the evaluation desired pattern; and wherein the evaluation desired pattern stored in said evaluation desired pattern memory means is used by said neural network internal evaluation means to perform a learning using the back propagation method when a terminating condition of the external output is met.

9. The system for learning the external evaluation standard according to claim 7, wherein:

said neural network processing means includes means for receiving the input pattern including a current input pattern and at least one past input pattern obtained as a result of said input means converting the external information at a current time and the external information at at least one past time.

10. The system for learning the external evaluation standard according to claim 3, wherein:

said neural network processing means includes means for receiving the input pattern including a current input pattern and at least one past input pattern obtained as a result of said input means converting the external information at a current time and the external information at at least one past time.

11. A system for learning the external evaluation standard according to claim 3, connected to a robot, said input means comprising means for receiving the external information which includes outputs from a plurality of visual sensors attached to the robot, wherein the external output indicates direction of movement of the robot.

12. A system for learning the external evaluation standard according to claim 1, said system being connected to a robot and further comprising an input means comprising means for receiving the external information which includes outputs from a plurality of visual sensors attached to the robot, wherein the external output indicates direction of movement of the robot.

* * * * *